United States Patent [19]

Tayloe et al.

[11] Patent Number: 5,774,806
[45] Date of Patent: Jun. 30, 1998

[54] METHOD AND SYSTEM FOR DYNAMICALLY BALANCING RING ALERT AND ATTACH-DETACH REGISTRATION TRAFFIC

[75] Inventors: Daniel Richard Tayloe, Phoenix; Kenneth Lee Sowles; Edward John Neyens, both of Chandler, all of Ariz.

[73] Assignee: Motorola, Inc., Schaumberg, Ill.

[21] Appl. No.: 523,175

[22] Filed: Sep. 5, 1995

[51] Int. Cl.[6] .................................................. H04B 7/185
[52] U.S. Cl. .......................... 455/427; 455/428; 455/435; 455/452
[58] Field of Search .................................. 455/12.1, 13.1, 455/13.2, 13.3, 33.1, 33.2, 33.4, 34.1, 34.2, 54.1, 54.2, 56.1, 427, 422, 428, 429, 430, 432, 433, 434, 435, 450, 452; 379/59, 60

[56] References Cited

U.S. PATENT DOCUMENTS 5,371,900   12/1994   Bar-On .................................. 455/54.1
5,539,921   7/1996   Tayloe ................................... 455/427

Primary Examiner—Reinhard J. Eisenzopf
Assistant Examiner—Thanh Le
Attorney, Agent, or Firm—Kevin K. Johanson

[57] ABSTRACT

A plurality of subscriber units (16) operate in a communication system (10) having dynamic nodes such as satellites (12). A communication management center (14) controls interface parameters and protocol employed by subscriber units (16). A system and method is employed to dynamically alter interface protocol used by subscriber units (16). Communication management center (14) calculates a balance between a first portion of subscriber units (16) assigned to perform attach-detach registration and a second portion of subscriber units (16) assigned to abstain from performing attach-detach registration when associating and disassociation from communication system (10). As available communication bandwidth varies according to present of future communication patterns, subscriber units (16) may be dynamically reassigned perform or abstain from performing attach-detach registration.

17 Claims, 3 Drawing Sheets

METHOD AND SYSTEM FOR DYNAMICALLY BALANCING RING ALERT AND ATTACH-DETACH REGISTRATION TRAFFIC

FIELD OF THE INVENTION

The present invention relates generally to wireless communications, and, more particularly, to management of registration traffic in a wireless system implementing attach-detach registration protocol.

BACKGROUND OF THE INVENTION

Traditionally wireless communication systems had sufficient bandwidth to utilize resources less efficiently. Conventional cellular communication when attempting to connect a call with a subscriber unit would ring an entire service area with a subscriber unit's identifier. As systems expanded, a system would only send a ring alert containing a subscriber unit's identifier to the cell or group of cells most recently entered within which a subscriber unit registered. Often for improved successful delivery of a ring alert, cells or groups of cells adjacent to the most recently registered cell were also "rung" with a subscriber unit's identifier. If a subscriber unit was still activated, it would respond to the ring alert message by phoning in to the system. The system would then connect both ends of the call and a conversation would commence. When a subscriber unit had shut down, however, the system still attempted to deliver calls to the subscriber unit. This transmission of a ring alert message to a non-activated subscriber unit essentially tied-up a communication channel needlessly.

More advanced systems employed techniques to conserve this needless transmission known as attach-detach procedures. In an attach-detach system, all subscriber units upon activating in a system would register with the system. This attach-detach registration not only informed the system of the subscriber units location for effective delivery of ring alert, but also served to inform the system that the subscriber unit was activated and actually listening for any ring alerts the system may send.

When a subscriber unit prepares to shutdown, it performs a detach registration wherein it notifies the system that it will not be listening for any ring alert messages that may be sent by the system.

The system, prior to ringing a particular subscriber unit, references a database containing an entry for each subscriber unit and determines if the subscriber unit is active. If the system determines the subscriber unit is active, meaning it has most recently performed an attach registration, then the system dispatches a ring alert to cells located near or about a subscriber unit.

When the system notes from referencing a subscriber unit's entry that the subscriber unit has most recently performed a detach registration and hence is inactive, the system refrains from needlessly squandering resources by dispatching a ring alert for an inactive subscriber unit.

Thus, attach detach registration has the potential of conserving bandwidth by knowing when a subscriber unit is active and dispatching a ring alert only during this activation window. However, the added attach-detach registration processes also require an expenditure of bandwidth dedicated to a subscriber unit during the performance of such acts. Particularly if a subscriber unit receives relatively few calls, then the use of registration bandwidth may overwhelm any ring alert bandwidth expended when a subscriber unit is shutdown.

Typically use of subscriber units exacerbates problems in attach-detach communication systems. Typical use patterns concentrate activation of subscriber units requiring attach registrations in the morning surrounding rush hours. During this period of time, users switch on subscriber units and perform an attach registration. Such a concentration of bandwidth demand for registration depletes available bandwidth for communication allocation. This results in a significant amount of system bandwidth being dedicated to ancillary non-revenue generating system housekeeping.

Thus, what is needed is a wireless communication system that can balance the benefits of conserving ring alert bandwidth by knowing if a subscriber unit is activated and conserving registration bandwidth by not requiring all subscriber units to perform attach-detach registration.

DESCRIPTION OF A PREFERRED EMBODIMENT

Figure 1:
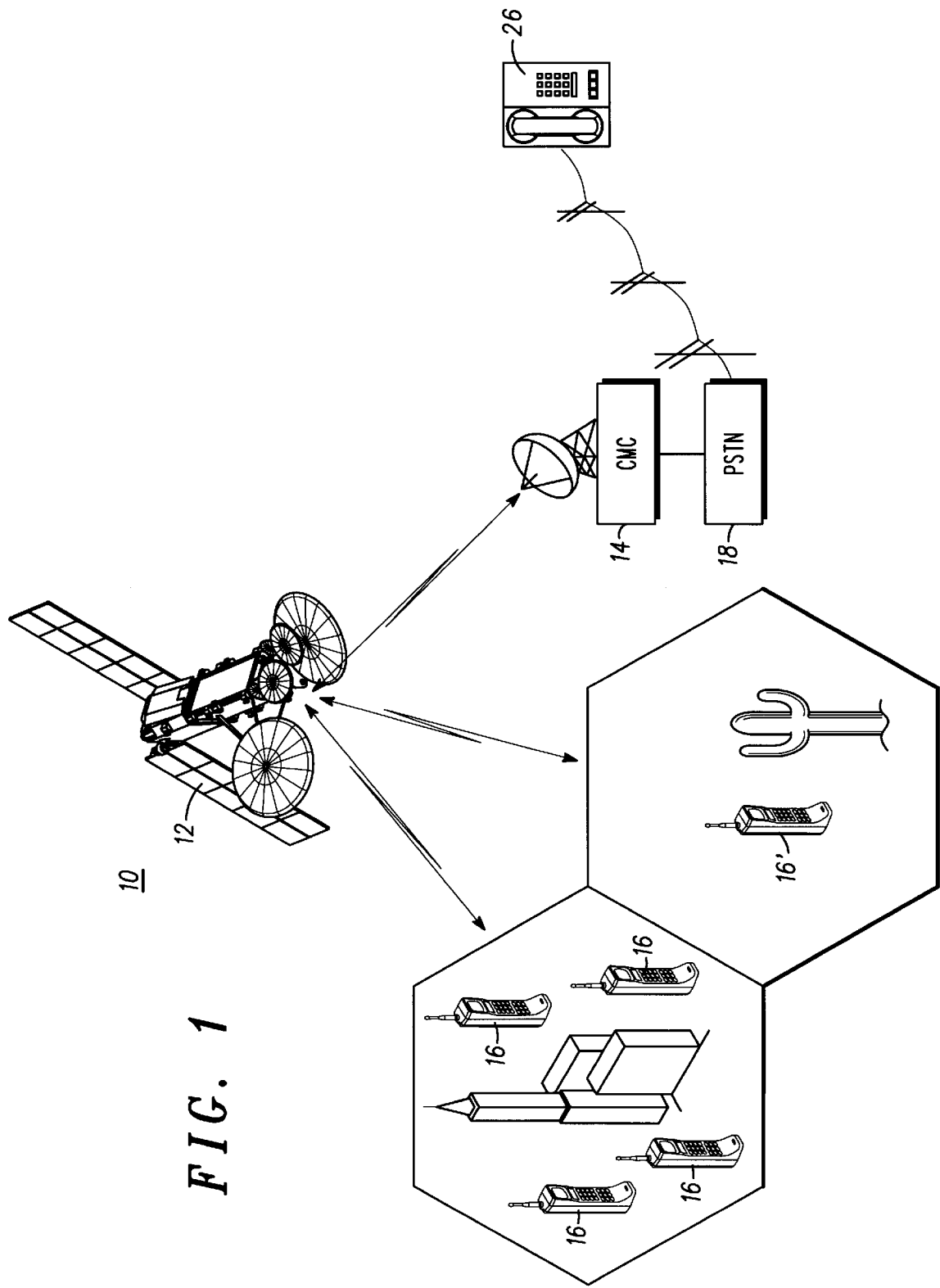
FIG. 1 depicts a highly simplified diagram of a satellite-based wireless communication system of which the present invention may form a portion thereof.

FIG. 1 depicts a highly simplified diagram of a satellite-based wireless communication system 10 of which the present invention may form a portion thereof. In the preferred embodiment, system 10 includes satellites 12, communication management center (CMC) 14, and subscriber units 16. Satellites 12 are or may be in radio communication with other satellites 12 that are within range, with CMC 14 within range, and with subscriber units 16 within range.

Satellites 12 and CMC 14 are switching centers for system 10. Each switching center receives incoming signals from any of a plurality of origins and switches the incoming signals to any of a plurality of destinations such as a traditional telephone 26 through PSTN interface 18. In the preferred embodiments, these signals may be digital packets which carry signaling or communication data. Signaling data represent messages that control the operation of services provided by system 10. One such type of signaling data is registration traffic. Such registration traffic informs CMC 14 of locations of subscriber units 16 and of operational status of such units. In system 10, attach-detach registration is available for use in managing interactions with subscriber units 16.

Communication data represent the payload information whose communication is the purpose for system 10. Subscriber units 16 and CMC 14 may include vocoders (not shown) to transform analog audio signals into digital packets and vice-versa. Other subscriber units 16 may be configured to communicate pure data or video.

Subscriber units 16 are typically distributed non-uniformly throughout system 10 as shown by subscriber unit 16'. Communication management practices tolerable in one cell or among groups of users in a single cell may not be ideal for users in another cell. For example, system 10 may have sufficient resources available in the cell enclosing subscriber unit 16' to allow subscriber unit 16' to perform attach-detach registration during a generally busy time. Bidding for system resources is not as competitive as in the cell circumscribing subscriber units 16. Subscriber units 16, in an attach-detach registration system, are required to register upon attachment with system 10. This attachment utilizes registration bandwidth and generally occurs during concentrated hours. Such a demand for non-revenue generating bandwidth depletes available communication bandwidth or in congested locals, may even exceed capacity by dedicating or reserving such capacity for attachment registration. Clearly, attach-detach registration has complications in regulating and managing bandwidth between registration traffic and communication traffic.

In a preferred embodiment of the present invention, CMC 14 generates a distribution wherein one portion of subscriber units 16 are assigned to perform attach-detach registration during association and disassociation with system 10. This distribution may be calculated by examining actual statistical data from subscriber units 16. If communication bandwidth is being reassigned to perform attach-detach registrations, then additional subscriber units 16 should be assigned to abstain from performing such registration.

However, as CMC 14 assigns too many subscriber units 16 to abstain from performing attach-detach registration at the expense of communication bandwidth, system 10 will needlessly dispatch ring alert to subscriber units 16 that are inactive in system 10. When ring alerts become frequent, communication bandwidth is needlessly wasted.

In the present invention, CMC 14 generates a probability or distribution utilizing ring alert densities and attach-detach registration densities to determine a balance that becomes optimal for a configuration of system 10. CMC 14 then dynamically assigns a portion of subscriber units 16 and 16' to perform attach-detach registration and another portion of subscriber units 16 and 16' to refrain from performing attach-detach registration. In one embodiment of the present invention, CMC 14 determines a probability or proportion of users assigned to perform attach-detach registration. When a subscriber unit 16 accesses system 10, CMC 14 generates a random number for subscriber unit 16 and if that number falls within a distribution for assigning attach-detach registration, then the subscriber unit is assigned to perform attach-detach registration until further notice. The status of a particular subscriber unit 16 is retained by CMC 14 for referencing in routing a call. If subscriber unit 16 is an attach-detach subscriber unit then ring alerts destined for the subscriber unit are not dispatched if the subscriber unit is in a detached state.

Figure 2:
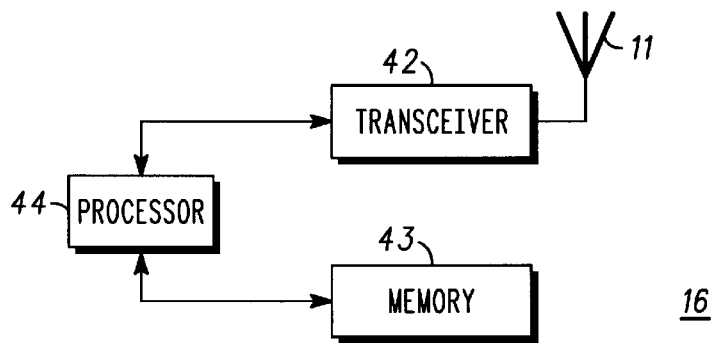
FIG. 2 is a simplified block diagram of a subscriber unit in accordance with an embodiment of the present invention.

FIG. 2 is a simplified block diagram of a subscriber unit 16 in accordance with an embodiment of the present invention. Subscriber unit 16 communicates with system 10, and may also communicate through system 10 to other SUs 16 or another telecommunication device. Subscriber unit 16 includes transceiver 42 which transmits and receives signals to and from communication system 10 using antenna 11. Transceiver 42 is desirably a multi-channel transceiver capable of transmitting and receiving on all frequency channels in specified time slots as required by system 10.

Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to memory 43.

Memory 43 includes semiconductor, magnetic, and other storage devices for storing data which serve as instructions to processor 44 and which, when executed by processor 44, cause subscriber unit 16 to carry out procedures which are discussed below. In addition, memory 43 includes variables, tables, and databases that are manipulated during the operation of subscriber unit 16.

Figure 3:
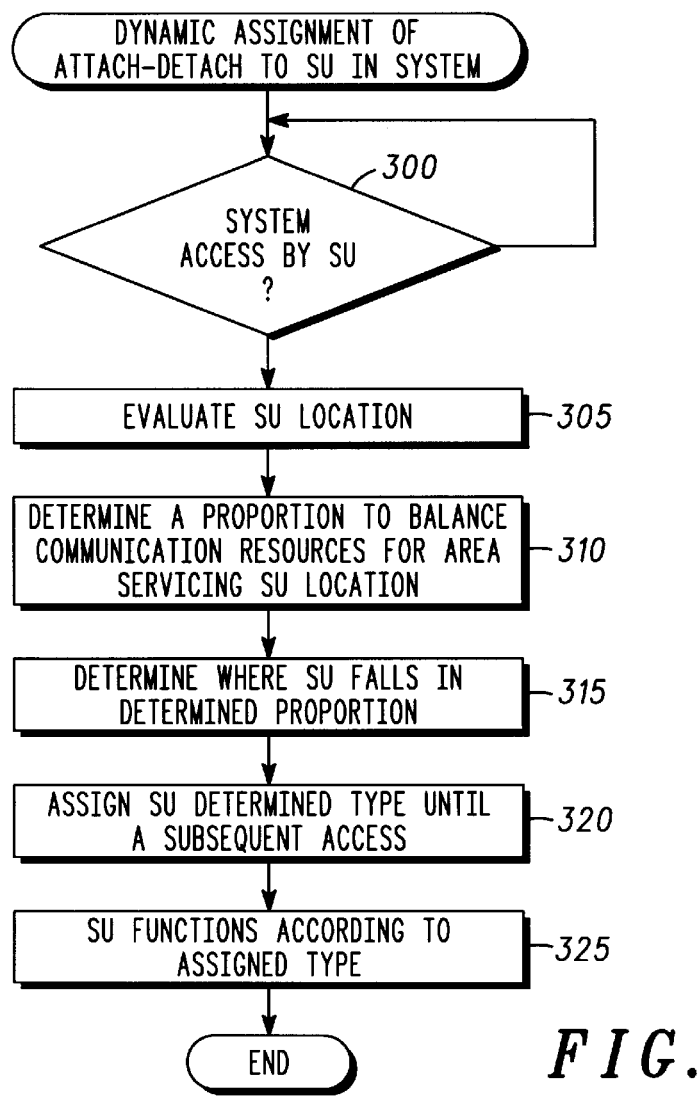
FIG. 3 is a flowchart for dynamic assignment of attach-detach registration functionality to a subscriber unit in a communication system in accordance with an embodiment of the present invention.

FIG. 3 is a flowchart for dynamic assignment of attach-detach registration functionality to a subscriber unit 16 in a communication system 10 in accordance with an embodiment of the present invention. Communication system dynamically assigns and retracts assignment of subscriber units 16 to perform attach-detach registration function.

A query task 300 evaluates if a subscriber unit is attempting to access communication system 10. A change in attach-detach functionality only occurs upon interaction by subscriber unit 16 with CMC 14. This interaction may be in the form of an attempt by subscriber unit 16 to establish a call or accessing may be a result of an attach-detach registration.

A task 305 evaluates the subscriber unit location when CMC 14 detects an access by subscriber unit 16. In a preferred embodiment, CMC 14 references a stored or generated location of subscriber unit 16 to determine a region within which to define probability. Different probabilities or balancing schemes may be employed for many criteria such as subscriber unit density in the region surrounding the accessing subscriber unit, or time of day near the accessing subscriber unit, or actual calling patterns of the subscriber unit within the region.

A task 310 determines a proportion as dictated by the location of the accessing subscriber unit. Determination of a proportion may include many factors such as regional calling habits, time-of-day calling habits, available system bandwidth, and other various characteristics associated with a subscriber unit and/or a region wherein the accessing subscriber unit is located.

A task 315 positions the accessing subscriber unit into a position in the probability to determine whether to assign the accessing subscriber unit an attach-detach status of attach-detach or assign a status forbidding attach-detach operation. This selection process may simply be defining a probability for assigning attach-detach followed by CMC 14 generating a random number for the accessing subscriber unit. CMC 14 evaluates this random number against the probability function to determine a status to assign to subscriber unit 16.

A task 320 assigns a type to accessing subscriber unit 16 and retains a copy of this status for future reference by CMC 14. Accessing subscriber unit 16 retains this status until a subsequent reevaluation of status during a subsequent access.

A task 325 is executed by subscriber unit 16 and CMC 14 wherein each function according to the type of subscriber unit status assigned in task 320. A subscriber unit assigned to function as an attach-detach type, until reassigned, performs attach registration upon activating and performs detach registration upon deactivation. A subscriber unit assigned to not perform attach-detach registration activates and deactivates without notifying CMC 14. CMC 14 references the assigned attach-detach status of a subscriber unit prior to dispatching a ring alert directed at the subscriber unit.

Figure 4:
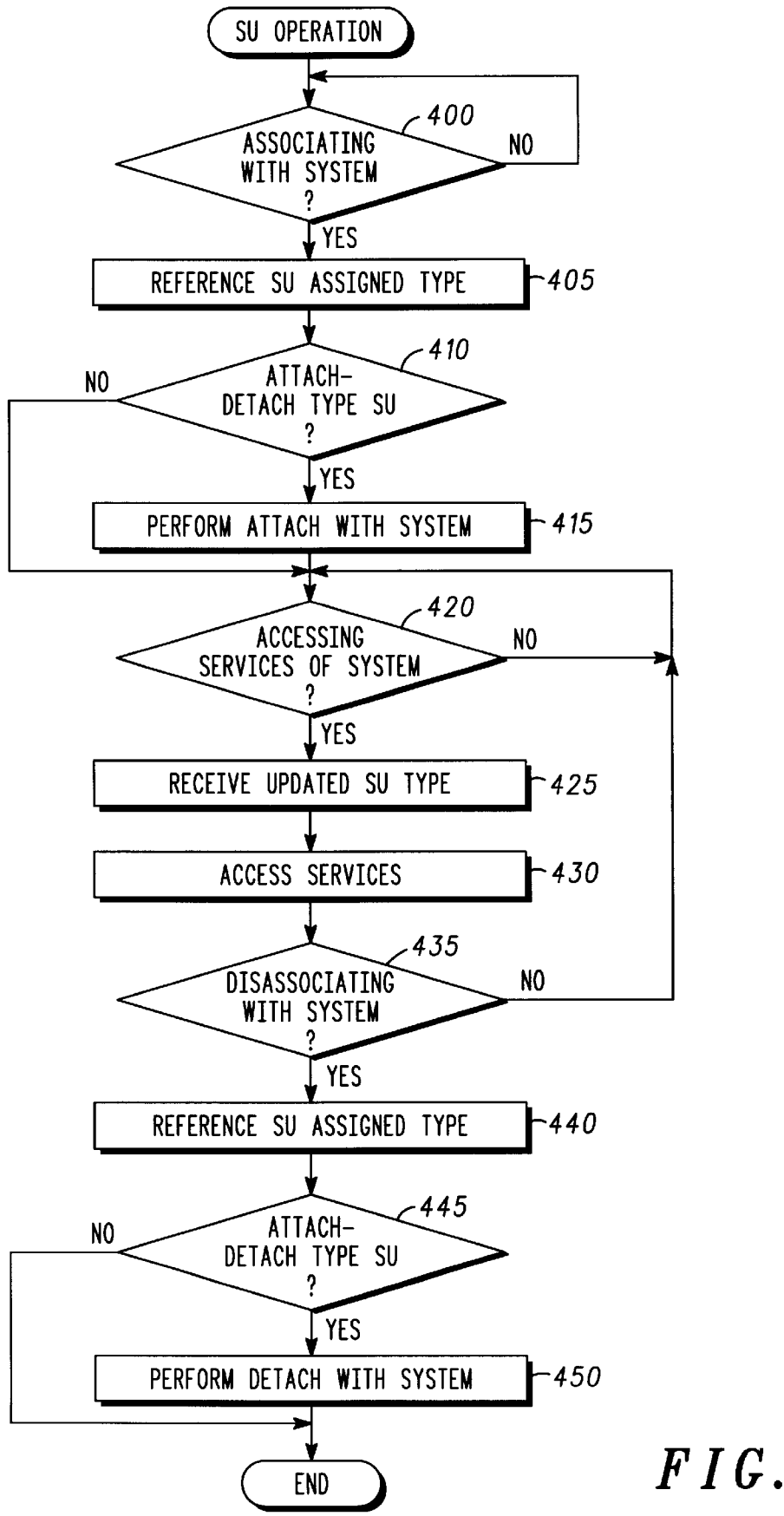
FIG. 4 is a flowchart for accessing communication services by a subscriber unit according to a dynamic assignment of attach-detach registration functionality, in accordance with an embodiment of the present invention.

FIG. 4 is a flowchart for accessing communication services by a subscriber unit according to a dynamic assignment of attach-detach registration functionality, in accordance with an embodiment of the present invention.

A query task 400 evaluates an attempt by a user to associate with communication system 10. If an attempt is not detected, then processing returns until the subscriber unit performs an attempt. A subscriber unit may perform an association when it either powers on or when it has been off-line with communication system 10.

A task 405, upon detecting an attempt to associate with communication system 10, references an attach-detach registration status which specifies subscriber unit 16 to be either an attach-detach registration type subscriber unit or a non-attach-detach registration type unit. System 10 assigned attach-detach registration status to subscriber unit 16 in a previous communication session.

A query task 410 evaluates which functionality subscriber unit 16 has been previously assigned. When attach-detach registration status indicates subscriber unit 16 to be an attach-detach type, subscriber unit 16 performs a task 415. In task 415, subscriber unit 16 performs an attach function wherein subscriber unit 16, in conjunction with communication system 10, resolves a present location for subscriber unit 16 and communication system 10 records subscriber unit 16 as an active subscriber unit operating within the system.

If attach-detach registration status denotes subscriber unit 16 as a non-attach-detach type, or when an attach-detach type subscriber unit completes attachment, then processing passes to a query task 420. In query task 420, subscriber unit 16 cycles until a user initiates an access of communication system 10. This access may be in the form of communication originating at subscriber unit 16, such as when subscriber unit 16 is the calling party, or access may be initiated at subscriber unit 16 in response to communication originating from communication system 10 and subscriber unit 16 is responding to a ring alert.

A task 425 receives an updated attach-detach registration status from communication system 10. This update may inform subscriber unit 16 to change its functionality, or subscriber unit 16 may be informed to continue operating as the same type of subscriber unit as previously assigned.

A task 430 then resumes access of communication services as initiated by subscriber unit 16. This may be responding to a ring alert or initiating communication as originated by the user of subscriber unit 16.

A query task 435 evaluates if subscriber unit 16 attempts to disassociate or shutdown from operating in communication system 10. If subscriber unit 16 is not attempting to disassociate, then processing returns to query task 420.

When query task 435 determines subscriber unit 16 attempting to disassociate from system 10, then a task 440 references the attach-detach registration status of subscriber unit 16. A query task 445 evaluates which functionality subscriber unit 16 has been previously assigned. When attach-detach registration status indicates subscriber unit 16 to be an attach-detach type, subscriber unit 16 performs a task 450. In task 450, subscriber unit 16 performs a detach function wherein subscriber unit 16 formally notifies CMC 14 that subscriber unit 16 is disassociating from system 10, such as during a shutdown.

If attach-detach registration status denotes subscriber unit 16 as a non-attach-detach type, or when an attach-detach type subscriber unit completes detachment, then processing terminates.

This invention allows a communication system to partition subscriber units into those that perform attach-detach functions and those that abstain from performing such actions. This allows a communication system to trade-off bandwidth consumed by needless ringing of disassociated subscriber units with bandwidth consumed by concentrated attachment profiles.

Although the preferred embodiment of the invention has been illustrated, and that form described in detain, it will be readily apparent to those skilled in the art that various modifications may be made therein without departing from the spirit of the invention or from the scope of the appended claims.

What is claimed is:

1. A method for dynamically assigning attach-detach registration to a subscriber unit in a wireless communication system comprising the steps of:

said subscriber unit accessing services of said wireless communication system;

said wireless communication system referencing a distribution for said attach-detach registration, said distribution defining a first proportion of users designated to perform said attach-detach registration and a second portion of users designated to not perform said attach-detach registration; and said wireless communication system assigning said attach-detach registration to said subscriber unit when said subscriber unit falls within said distribution.

2. A method as recited in claim 1, wherein said accessing step further comprises the step of:

resolving a location of said subscriber unit within said wireless communication system.

3. A method as recited in claim 1, wherein said referencing step further comprises the step of:

generating said distribution of both said first proportion of users designated to perform said attach-detach registration and said second portion of users designated to not perform said attach-detach registration by comparing both available channels and used channels in said wireless communication system.

4. A method as recited in claim 3 wherein said generating step comprises the steps of:

prior to said generating step, referencing a location of said subscriber unit; and generating said distribution in part using said location of said subscriber unit, said distribution being unique to said location of said subscriber unit.

5. A method as recited in claim 4 wherein said generating step further comprises the step of:

generating said distribution in part by comparing both said available channels and said used channels in said wireless communication system, said available channels and said used channels being a use profile of a present time in said wireless communication system.

6. A method as recited in claim 4 wherein said generating step further comprises the step of:

generating said distribution in part by comparing both said available channels and said used channels in said wireless communication system, said available channels and said used channels being a use profile of a future time in said wireless communication system.

7. A method as recited in claim 3 wherein said generating step comprises the steps of:

prior to said generating step, referencing an identification of said subscriber unit; and generating said distribution in part using said identification of said subscriber unit, said distribution being unique to said identification of said subscriber unit.

8. A method of operating a wireless communication system wherein a subscriber unit may be dynamically assigned to perform attach-detach registration comprising the steps of:

assigning said subscriber unit to perform said attach-detach registration when said subscriber unit falls within a distribution, said distribution defining a first proportion of users designated to perform said attach-detach registration and a second portion of users designated to not perform said attach-detach registration;

when said subscriber unit falls within said distribution defining said first proportion of users designated to perform said attach-detach registration, said wireless communication system designating said subscriber unit as an attach-detach type subscriber unit, an attach-detach status designating an assignment being maintained in a stored record;

said wireless communication system referencing said stored record prior to attempting communication with said subscriber unit;

referencing said attach-detach status of said subscriber unit prior to attempting communication with said subscriber unit when said stored record designates said subscriber unit as an attach-detach type subscriber unit; and if said subscriber unit is an attach-detach type subscriber unit, updating said attach-detach status when said subscriber unit enters or exits said wireless communication system.

9. A method as recited in claim 8 wherein said referencing said attach-detach status further comprises the steps of:

if said wireless communication system attempts communication with said subscriber unit, ringing said subscriber unit when said attach-detach status denotes said subscriber unit as attached to said wireless communication system; and when said attach-detach status denotes said subscriber unit as detached from said wireless communication system, abstaining from ringing said subscriber unit.

10. A method of dynamically modifying functionality of a subscriber unit during association and disassociation with a wireless communication system comprising the steps of:

when said subscriber unit attempts to associate with said wireless communication system, referencing attach-detach status;

when said attach-detach status indicates said subscriber unit is an attach-detach type subscriber unit, performing an attach registration with said wireless communication system;

when said attach-detach status indicates said subscriber unit is not an attach-detach type subscriber unit, abstaining from performing said attach registration with said wireless communication system;

when said subscriber unit accesses services of said wireless communication system, updating said attach-detach status as directed by said wireless communication system;

when said subscriber unit attempts to disassociate with said wireless communication system, referencing said attach-detach status;

when said attach-detach status indicates said subscriber unit is an attach-detach type subscriber unit, performing a detach registration with said wireless communication system; and when said attach-detach status indicates said subscriber unit is not an attach-detach type subscriber unit, abstaining from performing said detach registration with said wireless communication system.

11. A wireless communication system for dynamically assigning and canceling attach-detach registration, comprising:

a communication management center for determining a first portion of users designated to perform said attach-detach registration and a second portion of users designated to not perform said attach-detach registration, said communication management center also assigning an attach-detach status describing a mode of operation when one of said users falls within either said first portion or said second portion of said users;

a subscriber unit for referencing said attach-detach status as assigned by said communication management center, said subscriber unit performing attach-detach registration with said wireless communication system when said attach-detach status indicates said subscriber unit is an attach-detach type subscriber unit, and said subscriber unit abstaining from performing said attach-detach registration with said wireless communication system when said attach-detach status indicates said subscriber unit is not an attach-detach type subscriber unit; and a transmitter for relaying said attach-detach status and said attach-detach registration between said subscriber unit and said communication management center.

12. A wireless communication system as recited in claim 11 wherein said communication management center further comprises means for resolving a location of said subscriber unit within said wireless communication system.

13. A wireless communication system as recited in claim 11 wherein said communication management center further comprises means for generating a distribution of both said first proportion of users designated to perform said attach-detach registration and said second portion of users designated to not perform said attach-detach registration by comparing both available channels and used channels in said wireless communication system.

14. A wireless communication system as recited in claim 11 wherein said communication management center further comprises a means for ringing said subscriber unit when said attach-detach status denotes said subscriber unit as attached to said wireless communication system, and abstaining from ringing said subscriber unit when said attach-detach status denotes said subscriber unit as detached from said wireless communication system.

15. A wireless communication system as recited in claim 11 wherein said subscriber unit further comprises means for updating said attach-detach status as directed by said wireless communication system.

16. A subscriber unit in a wireless communication system wherein attach-detach registration is dynamically assigned and canceled, comprising:

a processor for referencing and updating an attach-detach status, said attach-detach status denoting whether said subscriber unit is an attach-detach type subscriber unit, when said attach-detach status indicates said subscriber unit is an attach-detach type subscriber unit, performing an attach-detach registration, and when said attach-detach status indicates said subscriber unit is not an attach-detach type subscriber unit, abstaining from performing said attach-detach registration;

a memory interfaced with said processor for storing said attach-detach status; and a transceiver for receiving said attach-detach status, said transceiver also transceiving registration data during said attach-detach registration.

17. A subscriber unit as recited in claim 16, wherein said subscriber unit further comprises means of cooperatively generating a location describing a position of said subscriber unit, said location being employed by said wireless communication system in assigning said attach-detach status.

* * * * *